United States Patent [19] [11] 3,989,941
Gasior et al. [45] Nov. 2, 1976

[54] EXTRUDER AND SCREW THEREFOR FOR EFFECTING TRANSVERSE CURRENTS IN WORK MATERIAL HANDLED THEREBY

[75] Inventors: Joseph Gasior, Bloomfield; A. W. Pomper, Edison, both of N.J.

[73] Assignee: Midland-Ross Corporation, Cleveland, Ohio

[22] Filed: Sept. 10, 1974

[21] Appl. No.: 504,817

Related U.S. Application Data

[63] Continuation-in-part of Ser. No. 292,972, Sept. 28, 1972, abandoned.

[52] U.S. Cl. ............................ 259/191; 259/DIG. 18
[51] Int. Cl.[2] ............................................ B29B 1/06
[58] Field of Search ............. 259/191, 192, DIG. 18, 259/9, 10, 193; 425/208

[56] References Cited
UNITED STATES PATENTS

| | | | |
|---|---|---|---|
| 2,556,276 | 6/1951 | Henning | 259/191 |
| 3,271,819 | 9/1966 | Lacher | 259/191 |
| 3,407,438 | 10/1968 | Selbach | 259/192 |
| 3,698,541 | 10/1972 | Barr | 259/191 X |
| 3,701,512 | 10/1972 | Schippers et al. | 259/191 |
| 3,858,856 | 1/1975 | Hsu | 259/191 |
| 3,870,284 | 3/1975 | Kruder | 259/191 |

FOREIGN PATENTS OR APPLICATIONS 1,351,109    12/1963    France ............................ 259/191

Primary Examiner—Peter Feldman
Assistant Examiner—Donald B. Massenberg
Attorney, Agent, or Firm—Woodrow W. Portz

[57] ABSTRACT

A heating device having a screw rotatable within a barrel therefor, such as a part of an extruder, especially constructed to circulate and heat a granular or particulate work load of fusible material while still in its particulate condition. The essential purpose is to heat the material to a uniform temperature just under plasticization in preparation for entering melting apparatus, such as a downstream melting section of an extruder. The screw has a core and a main thread defining a main channel in which the portions of the core surface extending side-by-side longitudinally of the channel deviate from an average core diameter throughout the length of the heating device to circulate the work load transversely of the channel and to heat the work load while in a granular condition.

8 Claims, 9 Drawing Figures

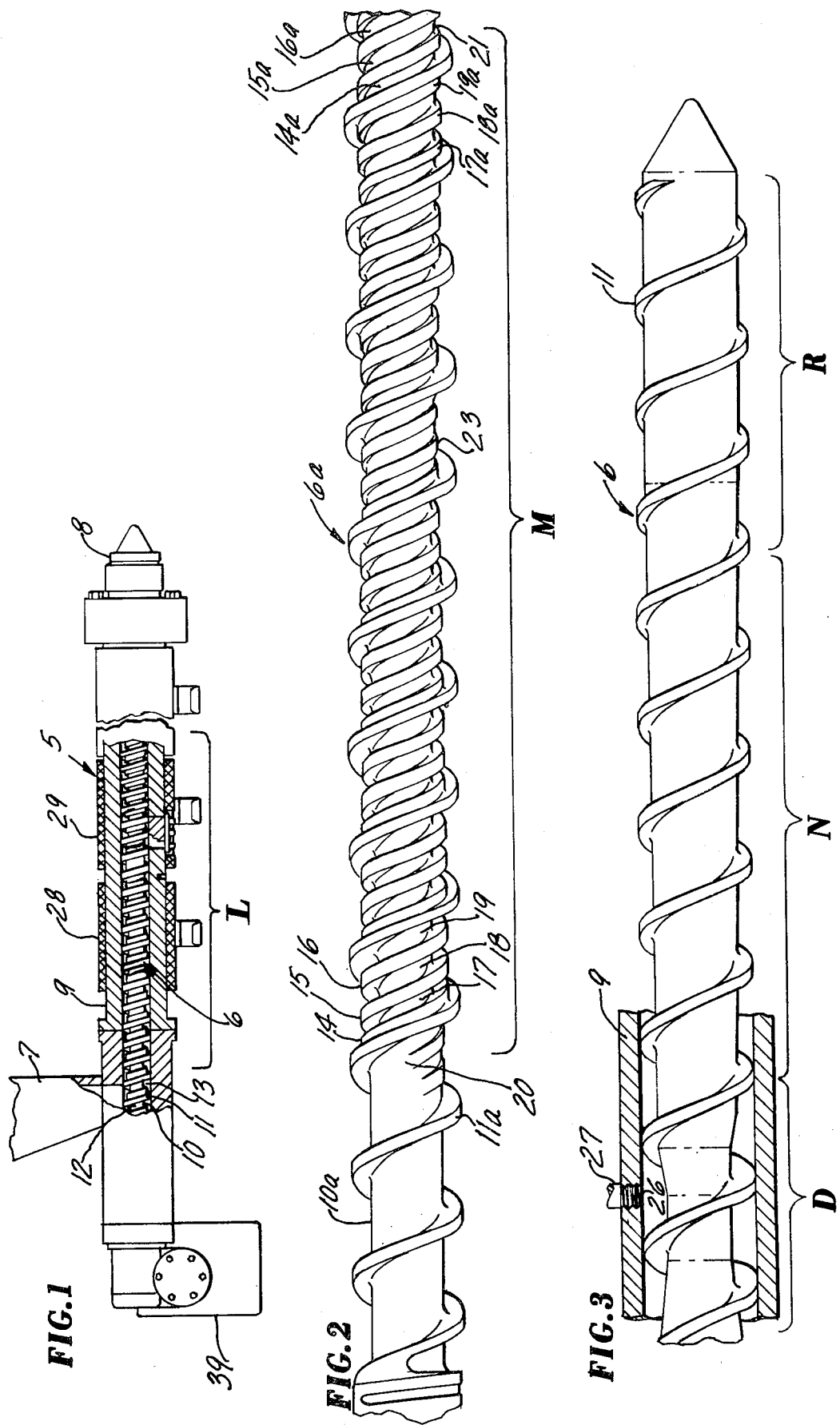

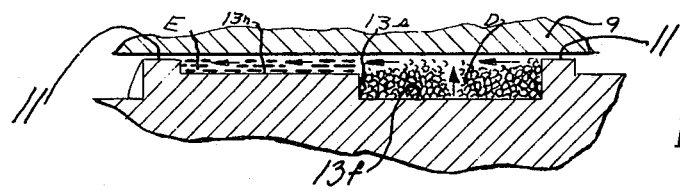
FIG.4
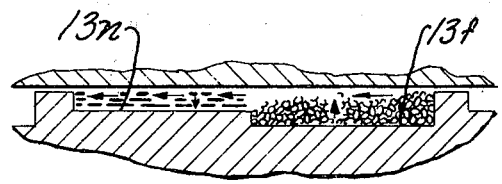
FIG.5
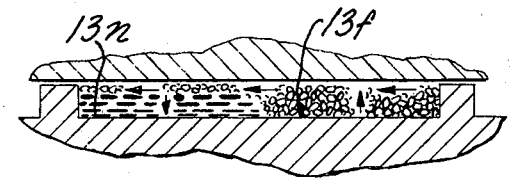
FIG.6
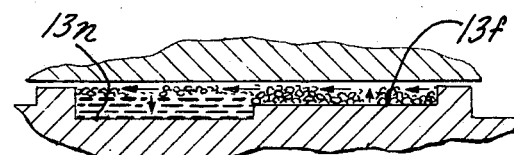
FIG.7
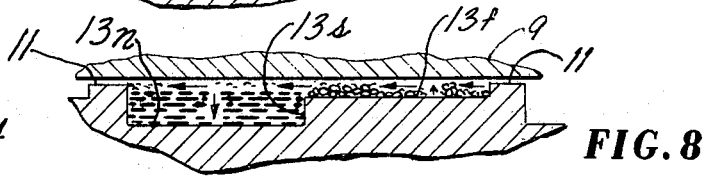
FIG.8
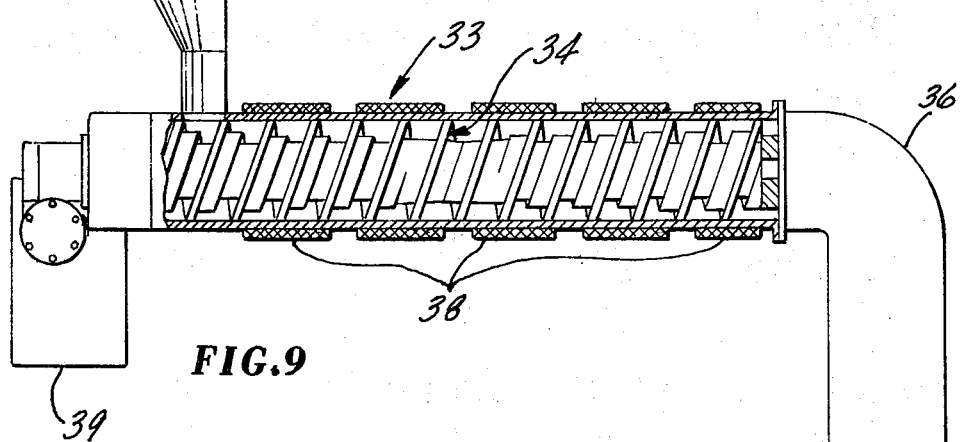
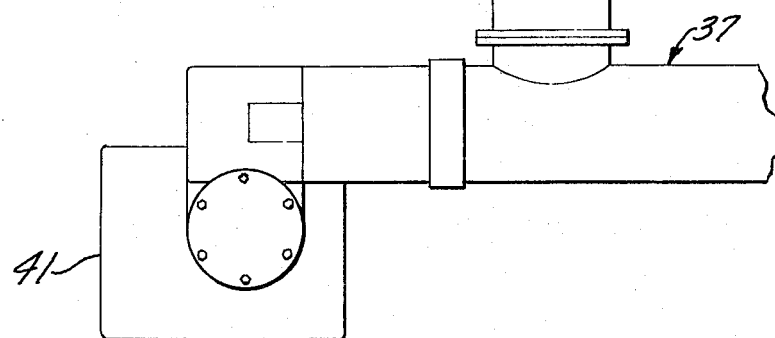
FIG.9

EXTRUDER AND SCREW THEREFOR FOR EFFECTING TRANSVERSE CURRENTS IN WORK MATERIAL HANDLED THEREBY

This application is a continuation-in-part of application Ser. No. 292,972 filed Sept. 28, 1972, now abandoned.

BACKGROUND OF THE INVENTION

In the conventional auger-type extruder, potentially fusible plastic material or resin, commonly in pellet, granule, powder or other particulate form, is introduced into the feed section of the extruder and conveyed as a substantially undisturbed body except for compaction. As it is carried toward the transition or melting zone while still in a particulate condition, the temperature thereof increases as heat transfers from the barrel into the outer surface of the body. Friction of the work body with the screw and the barrel also heats the body. However, the rate of temperature rise in the resinous body is primarily dependent upon the rate of heat transfer occurring at the interface of the inner barrel and the body or, more specifically, on the temperature difference between the barrel and the compacting plastic particles.

Heating of the body while particulate is inherently poor because of the inability to bring the particles at various depths within the body into continuous contact with the inner barrel surface. Heating of the resin becomes even more inefficient as the resin progresses lengthwise of the barrel because of the lessening in temperature difference between the barrel and the interfacial particles. The resin, while in particulate form, has quite low heat conductivity, and in demanding peak output from an extruder by operating at somewhat hazardly high barrel temperatures, the resin adjacent to the barrel may overheat while the interior of the body remains considerably cooler. Once the particulate material has reached fusion temperature, the work load may be subject to somewhat different heating principles and different screw structure, e.g., that described in U.S. Pat. No. 3,701,512 or U.S. Pat. No. 3,698,541.

It has been discovered that the heat exchange rate between the barrel and the granular resin body can be increased substantially throughout the apparatus through which it passes, such as a section of an extruder upstream from its melting section by causing continuous movement of a layer of particles adjacent the interface of granular body with the barrel transversely of the channel so as to circulate the particles along a transverse cross section of the body and thereby force into successive contact with the barrel the cooler portion of the body normally remaining radially inwardly of the channel. This principle of operation causes not only greater heat pickup by the resin at its interface with the barrel but enables the heated particles to move inwardly of the channel to dissipate heat into other portions of the particulate body.

An object of the invention is to provide an apparatus having special facility for heating granular materials, and when incorporated integrally within the structure of an extruder, to substantially increase the throughput thereof, and greatly increase its capacity as measured in pounds of extruded material per horsepower per hour over conventional machines of like size.

SUMMARY OF THE INVENTION

Accordingly, the invention resides in screw and encompassing barrel type apparatus, especially in a screw thereof which has a core and a helical main thread joined therewith coaxially with respect to the longitudinal axis of the screw to form a spiral channel extending lengthwise of the screw wherein the radius of the bottom or root surface varies to cause material displacement transversely within the channel. The apparatus is structured essentially for efficient heating of potentially thermoplastic granular material while in its granular or particulate condition.

The root surface of the channel in the granule-heating apparatus of the invention comprises at least a pair of transversely contiguous parallel areas which correspond in helicity with the main thread and extend coextensively through a section of the extruder. More than one pair of such areas may be formed in the bottom of the main channel. The area at the downstream side of the channel of any such pairs has a smaller radius than the adjacent area at the upstream side of the channel at the upstream end of the granule-heating apparatus and extends toward the downstream end thereof with the radius of the downstream side area concurrently progressively increasing to become substantially greater than the radius of the upstream side area. Thus, at the upstream end, the volume of the channel portion between the area thereof at the downstream side of the channel and the barrel is greater than that overlying the area at the upstream side of the channel of the apparatus but becomes substantially less at the downstream end of the apparatus to effect lateral transfer of the particulate material from the downstream side of the channel to its upstream side during passage along the heating apparatus.

The melting section of an extruder is herein defined as that section in adjacent downstream relation to the heating section into which the work load enters at near its fusion point. The heating apparatus for granular material referred to above occurs advantageously as a portion of a non-conventional extruder in which, since as a consequence of the heating section being able to more quickly heat particulate thermoplastic material to near its fusion temperature, the melting section is made shorter than in conventional extruders.

BRIEF DESCRIPTION OF THE DRAWING

FIG. 1 is a fragmentary, shortened side elevation of an auger-type extruder with a portion of its barrel broken away to expose the screw thereof.

FIG. 2 illustrates a substantial upstream portion of a modified screw depicting a plurality of pairs of material-shifting areas within the main channel of the main thread.

FIG. 3 illustrates a downstream portion of the screw shown in FIG. 1 or 2.

FIGS. 4, 5, 6, 7 and 8 are fragmentary views in longitudinal cross section of portions of the heating section of the extruder of FIG. 1. This figure is also typical of the thread structure shown exposed in FIG. 9.

FIG. 9 is a fragmentary schematic elevation illustrating the apparatus of the invention as a device separate from an extruder.

DESCRIPTION OF THE PREFERRED EMOBODIMENT

FIG. 1 illustrates an extruder 5 which may be conventional in its major components except for its screw 6. A particulate material, such as powder, granules or pellets is fed through a hopper 7 into an upstream portion of the extruder and when heated, mixed and brought to a fluid condition, is discharged through a die head 8. FIG. 3 illustrates a downstream portion of extruder screw 6 which is also suitable as the downstream portion of screw 6a. The upstream portion of screw 6a for heating a particulate material is shown in FIG. 2. Sections L and M are of screws 6 and 6a, respectively, are heating sections of different designs having the same general function, i.e., the advancement and heating of a particulate work load in cooperation with a heated barrel 9 in a manner described hereinbelow. A barrel 9 may be jacketed for circulation of a fluid therethrough or heated by other conventional means, such as the heaters 28, 29 shown in encompassing relation with the barrel 9 in FIG. 1.

Typically, a screw in accordance with the invention has a core and a main thread formed thereon which may extend as shown in the figures of the drawing at uniform pitch along the entire length of the screw. As shown, the extruder screw 6 comprises a core 10 and a main thread 11 extending at uniform pitch along the entire length of the screw. In a similar manner, the screw 6a of FIG. 2 has a core 10a and a main thread 11a. The core and the thread along with the barrel 9 define a continuous main channel having a root surface 12 along the outer perimeter of the core 10. In the feed section of the extruder or heating device, i.e., near the hopper 7, the root surface 12 may be smooth as shown for an initial turn or two. Beyond these initial smooth turns, the core surface suddenly takes a contour crosswise of the main channel approximately as shown in FIG. 4 wherein the core surface between successive turns of a thread 11 is divided into areas 13n and 13f.

FIGS. 4 to 8 illustrate progressive changes in the radii of root areas 13n, 13f along the main channel in the downstream direction thereof. Looking at any cross section of the channel as typified by FIGS. 4 to 8, core area 13n is nearer to a material receiving region of the extruder or device as provided by the hopper 7 and the adjacent extruder interior, then the adjacent relatively downstream area 13f.

Arrows indicating work load movement in FIGS. 4 to 8 illustrate frictional dragging of material which occurs along the interface of the work load resulting in the transfer of material from the channel portion D overlying an area 13f to portion E of the channel overlying the area 13n. This movement of material transversely of the channel is accompanied by a radial movement of material outwardly within channel portion D as the radius of area 13f increases and movement of the material filling in the growing channel portion E overlying area 13n as its radius decreases. As all FIGS. of the drawing indicate, there is no structural barrier to movement of material from channel portion D and channel portion E. Structurally, the areas 13f and 13n are in step relation with each other through connection by a radially extending shoulder surface 13s. The shoulder changes in radial extent and disappears momentarily as shown in FIG. 6 as the radii of areas 13n and 13f become equal. In FIG. 4, the shoulder 13s is seen facing downstream and then, in FIG. 8, facing upstream as areas 13n and 13f are extended downstream through a cycle of radius change. It is contrary to the practice of this invention to have the structure of the screw continued in a downstream direction from FIG. 8 by a reversal of the progression of the radius change carried out through FIGS. 4 to 8.

This invention is based on radius change of areas 13n and 13s in the manner illustrated in FIGS. 4 to 8 whereby the radius of area 13n in the portion of the channel of material-heating section nearer the material receiving region of the apparatus is substantially greater than, and the radius of the area 13f is substantially less than an average radius to which the root surface of the main channel of the screw is constructed. In the downstream direction of the screw, the radius of area 13n gradually decreases with concurrent increasing in the radius of the area 13f until the radius of area F becomes substantially greater and the radius of area N becomes substantially less than the average radius.

In the modified feeding and conveying section M of the screw 6a shown in FIG. 2, the structure of the core changes from the smooth core portion shown at the left in a substantial manner to provide secondary threads or areas 14, 15, 16 spaced by secondary channels or areas 17, 18, 19. Areas 14, 15, 16 are initially in the form of secondary threads which, at their maximum height are at less radii relative to the screw axis than the main thread 11a but substantially greater than an average radii of all of the root areas. Areas 17, 18, 19, on the other hand, are located at the bottom of grooves of maximum depth at the upstream end of the granule-heating portion of the screw and their radii are substantially less than an average radius of all of the areas.

Throughout the section M, i.e., the portion of the screw beginning at point 20 indicating the upstream end of the stepped heating section of the screw, the core 12 is visualized as having an approximately uniform average diameter similar to that of the smooth core section at the extreme left throughout the length of the section M and ending at an approximately point 21 such as to establish uniform volumetric relationship throughout the section between the screw 6a and the barrel 9. Deviations from this average diameter are most obvious at the upstream end and downstream end of this section. FIG. 2 illustrates that, between points 20 and 21, the radii of the secondary threads represent the areas 14, 15, 16 gradually decrease throughout the section M while the root surfaces 17, 18, 19 of the secondary channels gradually increase in radius to cause the overall main channel surface to become almost smooth approximately at a point 23. At point 23, a transition occurs wherein the previously thread like surfaces 14, 15, 16 become recessed with respect to the previously depressed areas 17, 18, 19 which now take the form of secondary threads or ridges 17a, 18a, 19a of increasing radius or height in a like manner, areas 14, 15, 16 provided initially but the secondary threads now become secondary channels 14a, 15a, 16a along a downstream portion of section M.

Under preferred operation of the extruder 5, heating of the load passing through a heating section L thereof (or section M of screw 6a in FIG. 2) is controlled in a manner, such as to maximize heat input from the barrel into the transversely shifted granular material without causing melting or substantial agglomeration of the particles. Ideally, the material arrives at point 21 or an analogous point on screw 6, close to its fusion temperature although some coalescence of particles can be tolerated and is not especially detrimental in the practice of this invention. Many materials, under the heating and mechanical action to which they are subjected in the granule heating section of either screws 6 or 6a, require degassification after passing downstream from this section. As shown in FIG. 3, the extruder may comprise a section D in which the space available to the load between the core 10 and the barrel 9 has increased to allow the load to be loosely transported under a condition of zero or negative pressure through section D and gas to be withdrawn through an aperture 26 through the barrel wall and a tube 27 secured thereon which may be connected to a vacuum source. In an approximate manner, the letters N and R indicate melting and metering sections, respectively, of the extruder.

A major advantage of the invention is that the melting section may be substantially shorter than in conventional extruders as a result of heating the load material more rapidly while in the particulate stage as practiced within section M. As shown, the length of the melting section N equals approximately four diameters of the main thread 11 or 11a, or the inner surface of the barrel 9. In the practice of this invention, the length of the melting section may vary from ½ to about 4 diameters of the barrel.

An obvious consequence of this invention is that the screw is substantially redesigned and the barrel is heated to provide a heating section for particulate material of a length which will be effective in bringing the work load to a temperature near its fusion temperature in a minimum of extruder length. It is intended that the load be maintained in its particulate condition while subjected to transverse shifting and systematic displacement of material from the downstream side of the channel to its upstream side. With the consequent rapid approach to a fusion temperature of the work material, a substantially shorter melting section than conventionally used is obtained. The metering section R may be provided as illustrated in a conventional configuration. The melting section of the screw may be constructed to rapid melting configurations, such as taught in U.S. Pat. Nos. 3,671,021; 3,689,182; and 3,698,541. Heaters, such as heaters 28, 29 may encircle the barrel 9. Means may be provided for heating sections M, D, N, and R such as heaters 28, 29 which encircle the barrel 9.

FIG. 9 illustrates an embodiment of the invention wherein the heating and conveying device 33 has a screw 34 which is shown with thread and core structure similar to that of the heating section L of the extruder 5 (see FIG. 1). Device 33 is adapted to receive a particulate material through a hopper 34 and to forward the material by the screw 34 while it is in an essentially particulate stage in a manner as herein described with respect to the extruder 5 to a conduit 36 connecting the device 33 with a melt-down extruder 37. Essential to the heating of the particulate material in the device 33 is heating means, such as the heaters 38. The device 33 is driven by a motor and gear reduction unit 39. The melt down extruder 37 is driven independently by a motor and gear reduction unit 41.

The embodiments of the invention described above disclose a heating apparatus for the thermoplastic particulate material which may take the form of an integral portion of an extruder of thermoplastic materials, or it may be constructed as an independent device for supplying heated particulate material to equipment of any other type useful for processing the heated material. The heating apparatus of the invention is constructed to induce internal localized movement in the work material while in a particulate condition to bring successive portions of the load into contact with the inner barrel surface. In this manner, the extruder load is heated more rapidly and more uniformly than has been achieved in previous practice in the handling of particulate materials. A very material advantage of the apparatus is that an extruder can be designed with a shorter melting section than has heretofore been practical. The improvement in the extruder output over conventional types has been amply illustrated with prototype constructed according to FIGS. 1 to 8 with the surprising results that extruder outputs of 30 to 60 pounds per hour per horsepower are achieved in contrast to 6 to 10 pounds per hour per horsepower using conventional screws.

What is claimed is:

1. Auger type apparatus useful for heating a potentially thermoplastic particulate or granular material to a temperature approaching its fusion temperature, said apparatus comprising:

a material-heating section having a screw, a barrel coaxially encompassing the screw, and means for heating the barrel; said screw having a core of substantially uniform average diameter and a main thread thereon arranged along the longitudinal axis of the screw to define a spiral main channel extending from an upstream material receiving region toward a material-discharging region;

said core within said section defining a bottom or root surface for said main channel comprising at least one pair of side-by-side parallel areas corresponding in helicity to the main thread; in any transverse cross section of the channel, a first area of said pair being nearer to, and the second area being further away from, said material receiving region; the radii of said areas varying transversely at the channel bottom to place said areas in step relationship while maintaining an approximately uniform transverse cross sectional area of said channel and an approximate average radius of said bottom surface throughout the length of said material-heating section;

within said material-heating section adjacent the material receiving region, the radius of said first area being substantially greater than, and the radius of the second area being substantially less than, said average radius;

the radius of the first area gradually decreasing with concurrent increasing in the radius of the second area in the downstream direction of the screw until said radius of the first area becomes substantially greater and the radius of the second area becomes substantially less, than said average radius;

said barrel acting, during operation, to continually frictionally transfer material at the interface of a second channel portion radially overlying said second area to the interface of a first channel portion overlying said first area to cause displacement of material radially outwardly within said second portion and radially inwardly within said first portion.

2. The apparatus of claim 1 wherein:
said root surface of said heating section consists of one pair of said side-by-side areas.

3. The apparatus of claim 1 wherein:
said root surface of said heating section consists of a plurality of pairs of said areas.

4. The apparatus of claim 1 wherein:
said apparatus is a screw-type extruder having a melting section in downstream relation with said heating section which has a channel root surface of substantially uniform radius along any transverse cross section of the channel.

5. The apparatus of claim 4 wherein:
the axial length of said melting section is in the approximate range of ½ to 4 diameters of said main thread.

6. A screw for an auger-type apparatus useful for heating and conveying a potentially thermoplastic particulate or granular material to a temperature approaching its fusion temperature, comprising:
- a heating section having a core and a main thread thereon arranged along the longitudinal axis of the screw to define a spiral main channel extending in a direction from its upstream end toward its downstream end;
- said core within said section defining a bottom or root surface for said main channel comprising at least one pair of side-by-side parallel areas corresponding in helicity to the main thread; in any cross section of the channel, a first area of said pair being nearer to, and the second area of said pair being further away from, said upstream end; the radii of said areas varying transversely at the channel bottom to place said areas in step relationship while maintaining an approximately uniform transverse cross sectional area of said channel and an approximate average radius of said bottom surface throughout the length of said material heating section; beginning at the upstream end of said material heating section, the radius of the first area being substantially greater than, and the radius of the second area being substantially less than, said average radius; the radius of the first area gradually decreasing with concurrent increasing in the radius of the second area in the downstream direction of the screw until said radius of the first area becomes substantially less, and the radius of the second area becomes substantially greater, than said average radius.

7. The screw of claim 6 comprising:
a melting section in downstream relation with said heating section adapted for melting particulate material when heated along said heating section, said melting section having a channel root surface of substantially uniform radius along any transverse cross section of the channel.

8. The screw of claim 7 wherein:
the axial length of said melting section is in an approximate range of one half ot four diameters of said main thread.

* * * * *